(12) United States Patent
Mishima et al.

(10) Patent No.: US 9,092,870 B2
(45) Date of Patent: Jul. 28, 2015

(54) TECHNIQUES TO SUPPRESS NOISES IN AN IMAGE TO PRECISELY EXTRACT SHAPES AND EDGES

(75) Inventors: Nao Mishima, Tokyo (JP); Kenzo Isogawa, Kanagawa (JP); Ryusuke Hirai, Tokyo (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1159 days.

(21) Appl. No.: 13/061,270

(22) PCT Filed: Aug. 28, 2009

(86) PCT No.: PCT/JP2009/065100
§ 371 (c)(1),
(2), (4) Date: May 13, 2011

(87) PCT Pub. No.: WO2010/024402
PCT Pub. Date: Mar. 4, 2010

(65) Prior Publication Data
US 2011/0205235 A1    Aug. 25, 2011

(30) Foreign Application Priority Data
Aug. 29, 2008   (JP) .................. 2008-222696

(51) Int. Cl.
*G09G 5/00* (2006.01)
*G06T 7/00* (2006.01)
(52) U.S. Cl.
CPC .................... *G06T 7/0085* (2013.01)
(58) Field of Classification Search
CPC ..................................................... G06T 13/40
See application file for complete search history.

(56) References Cited

U.S. PATENT DOCUMENTS

| 6,229,905 | B1 | 5/2001 | Suzaki | |
|---|---|---|---|---|
| 2001/0017935 | A1 | 8/2001 | Suzaki et al. | |
| 2002/0013683 | A1 | 1/2002 | Toyama et al. | |
| 2003/0194013 | A1* | 10/2003 | Alvarez | 375/240.24 |
| 2004/0190787 | A1* | 9/2004 | Nakami | 382/260 |

(Continued)

FOREIGN PATENT DOCUMENTS

| JP | 11-113885 | 4/1999 |
|---|---|---|
| JP | 2001-283252 | 10/2001 |

(Continued)

OTHER PUBLICATIONS

Written Opinion for PCT/JP2009/065100.
(Continued)

*Primary Examiner* — Edward Martello
(74) *Attorney, Agent, or Firm* — Amin, Turocy & Watson, LLP

(57) ABSTRACT

An image processing apparatus includes an operating unit configured to calculate a tangent-line direction of an edge and a normal-line direction of the edge by using a vertical-direction derivative value and a horizontal-direction derivative value of a pixel value of a pixel in an input image; a converting unit configured to convert local coordinates positioned within a predetermined area with respect to a target pixel in the input image into rotated coordinates, by rotating the local coordinates according to an angle formed by the horizontal direction and the tangent-line direction of the edge; and a fitting unit configured to perform, at the rotated coordinates, a fitting process that employs a least-squares method by using a curved surface model expressed with the pixel value of the target pixel in the input image.

20 Claims, 13 Drawing Sheets

(56) References Cited

U.S. PATENT DOCUMENTS

| | | | |
|---|---|---|---|
| 2006/0039624 A1 | 2/2006 | Kong et al. | |
| 2007/0047838 A1 | 3/2007 | Milanfar et al. | |
| 2007/0172141 A1 | 7/2007 | Bando | |
| 2009/0148062 A1* | 6/2009 | Gabso et al. | 382/266 |
| 2010/0079630 A1 | 4/2010 | Mishima et al. | |
| 2010/0232697 A1 | 9/2010 | Mishima et al. | |

FOREIGN PATENT DOCUMENTS

| | | |
|---|---|---|
| JP | 2004-125690 | 4/2004 |
| JP | 2004-133551 | 4/2004 |
| JP | 2006-025105 | 1/2006 |
| JP | 2006-059346 | 3/2006 |
| JP | 2007-201533 | 8/2007 |
| JP | 2007-293550 | 11/2007 |

OTHER PUBLICATIONS

C. Harris and M. Stephens, "A Combined Corner and Edge Detector", 1988, pp. 147-154.

International Search Report for PCT/JP2009/065100.

Takeda et al., "Kernal Regression for Image Processing and Reconstruction," IEEE, vol. 16, No. 2, Feb. 2007, pp. 349-366.

* cited by examiner

ORIGINAL IMAGE

TWO-DIMENSIONAL GAUSSIAN FUNCTIONS dx dy du (LONG AXIS)

dv (SHORT AXIS)

TECHNIQUES TO SUPPRESS NOISES IN AN IMAGE TO PRECISELY EXTRACT SHAPES AND EDGES

FIELD

The present invention relates to an image processing apparatus, an image processing method, and an image display apparatus.

BACKGROUND

Patent Literature 1 discloses a technique for obtaining an ideal noise-free image surface by performing a least-squares fitting process while using a parametric curved surface. According to this technique, a method called "kernel regression" is used. With this method, it is possible to extract shapes and edges in an input image with a higher level of precision than when an ordinary linear filtering method is used.

CITATION LIST

Patent Literature

Patent Literature 1: United States Patent Application Publication No. 2007/0047838

SUMMARY

Technical Problem

However, problems remain where the image becomes too blurry due to a smoothing process when a low-order polynomial curved surface is used, whereas the image is more likely to have noises due to over-fitting when a high-order polynomial curved surface is used.

The present invention has been made in view of the above, and an object thereof is to precisely extract shapes and edges of an input image and to suppress noises in an image.

Solution to Problem

To achieve the object, an image processing apparatus according to the present invention includes: a calculating unit configured to calculate at least one of a tangent-line direction and a normal-line direction of an edge around a target pixel in an input image by using a direction and a magnitude of a gradient of pixel values of pixels neighboring the target pixel in the input image; a converting unit configured to convert coordinates of pixels neighboring the target pixel into a rotated coordinate system rotated to coordinate axes in accordance with the tangent-line direction or the normal-line direction of the edge; and a fitting unit configured to obtain a curved surface by using a curved surface model described by a position of pixels on the rotated coordinate system, the curved surface approximating a distribution of local pixel values neighboring the target pixel, and calculate a corrected pixel value of the target pixel from an approximated pixel value of the target pixel on the curved surface.

Furthermore, an image processing apparatus according to the present invention includes: a calculating unit configured to calculate a direction and a magnitude of a gradient of pixel values of pixels neighboring a target pixel in an input image; a storage unit configured to store a filter coefficient for each of combinations of the direction and the magnitude of the gradient of the pixel values, the filter coefficient being determined by a curved surface approximated by using a curved surface model, the curved surface model described by variables of displacement on coordinate axes in accordance with a tangent-line direction or a normal-line direction, a degree of freedom of the variable on the normal-line direction is higher than that of the variable on the tangent-line direction; a selecting unit configured to refer to the storage unit and selects the filter coefficient based on the direction and the magnitude of the gradient calculated for the target pixel; and a convolution unit configured to calculate a corrected pixel value of the target pixel by filtering based on the selected filter coefficient.

Advantageous Effects of Invention

According to the present invention, it is possible to precisely extract the shape and edges of an input image and suppress noises in an image.

DESCRIPTION OF EMBODIMENTS

First Embodiment

Figure 1:
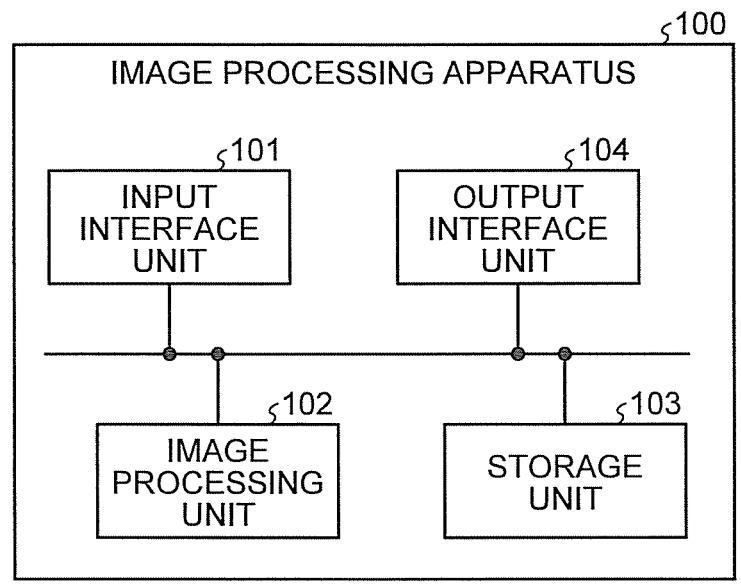
FIG. 1 is a diagram illustrating an image processing apparatus according to a first embodiment.

As shown in FIG. 1, an image processing apparatus 100 includes an input interface unit 101, an image processing unit 102, a storage unit 103, and an output interface unit 104.

The input interface unit 101 is connected to an input device that inputs an image to the image processing apparatus 100. The input interface unit 101 obtains the input image from the input device. The image processing unit 102 performs processes such as a filtering process on the input image. By performing the processes, the image processing unit 102 generates an image from which noises have been eliminated. The storage unit 103 stores therein, for example, the input image that has been obtained by the input interface unit 101 and the image that has been processed by the image processing unit 102. The output interface unit 104 is connected to an output device that outputs images. The output interface unit 104 outputs the images that have been stored in the storage unit 103 to the output device.

One or both of the input device and the output device may be provided on the outside of the image processing apparatus 100 or within the image processing apparatus 100.

Figure 2:
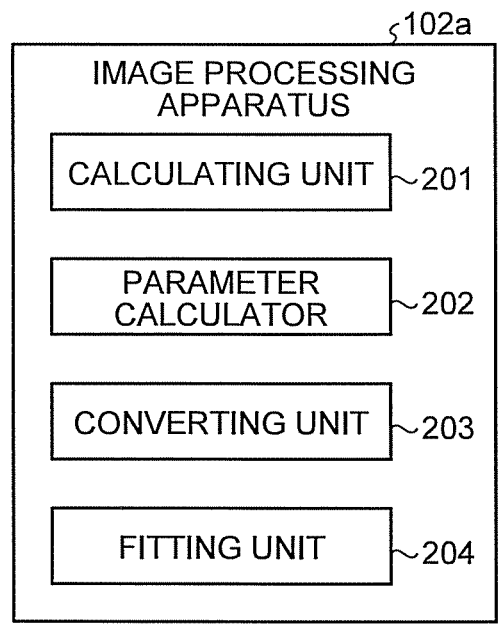
FIG. 2 is a diagram illustrating an image processing unit according to the first embodiment.

As shown in FIG. 2, an image processing unit 102a that corresponds to the image processing unit 102 shown in FIG. 1 includes an calculating unit 201, a parameter calculator 202, a converting unit 203, and a fitting unit 204.

Operations performed by the image processing unit 102a shown in FIG. 2 will be explained with reference to FIG. 3. In the following sections, a position in an input image will be expressed as x (where x∈Ω), whereas a set made up of the entirety of positions in the input image will be expressed as Ω (where $\Omega \subset R^2$), while a pixel value in the position x in the input image will be expressed as I(x). The pixel value may be, for example, a scalar value (e.g., a luminance value) or a vector value (e.g., a Red/Green/Blue [RGB] color signal). A transposition of a matrix or a vector will be expressed by adding a superscript "T" to the matrix or the vector. Num(N) denotes the number of elements in a set N.

At step S301, for each of the pixels in the input image, the calculating unit 201 calculates a direction and a magnitude of the gradient of a pixel value in a surrounding area of the pixel. According to the first embodiment, an example will be explained in which the calculating unit 201 performs a discretized first-order derivative operation to calculate the direction and the magnitude of the gradient of the pixel value. In the discretized first-order derivative operation, it is possible to use, for example, a Sobel operator. In the case where a Sobel operator is used, the calculating: unit 201 performs calculations as shown in Expressions (1) below.

$$d_x(x) = \begin{bmatrix} -1 & 0 & 1 \\ -2 & 0 & 2 \\ -1 & 0 & 1 \end{bmatrix} * I(x) \quad (1)$$

$$d_y(x) = \begin{bmatrix} -1 & -2 & -1 \\ 0 & 0 & 0 \\ 1 & 2 & 1 \end{bmatrix} * I(x)$$

In Expressions (1), $d_x(x)$ denotes an x-direction derivative value in the position x, whereas $d_y(x)$ denotes a y-direction derivative value in the position x. The symbol "*" denotes a convolution operation. The value $d_x(x)$ is expressed by using Expression (2) shown below.

$$d_x(x) = -I(x+(-1,-1)^T) + I(x+(1,-1)^T) - 2I(x+(-1,0)^T) + 2I(x+(1,0)^T) - I(x+(-1,1)^T) + I(x+(1,1)^T) \quad (2)$$

It is acceptable to perform a discretized derivative operation that uses any other elements besides the Sobel operator. For example, it is acceptable to use any of the followings: a forward difference, a backward difference, and a central difference.

At step S302, the parameter calculator 202 calculates image feature parameters indicating the direction and the magnitude of an edge in the position x, by using $d_x(x)$ and $d_y(x)$. First, according to the direction and the magnitude of the edge, the parameter calculator 202 calculates a two-dimensional Gaussian function that is expressed with an anisotropic Gaussian distribution. The two-dimensional Gaussian function is defined as shown in Expressions (3) below, by using a structure tensor H(x) of the derivative value.

$$k(x, s) = \exp\left(-\frac{1}{h^2} s^T H(x) s\right) \quad (3)$$

$$H(x) = \begin{bmatrix} d_x(x)^2 & d_x(x)d_y(x) \\ d_x(x)d_y(x) & d_y(x)^2 \end{bmatrix}$$

Figure 4:
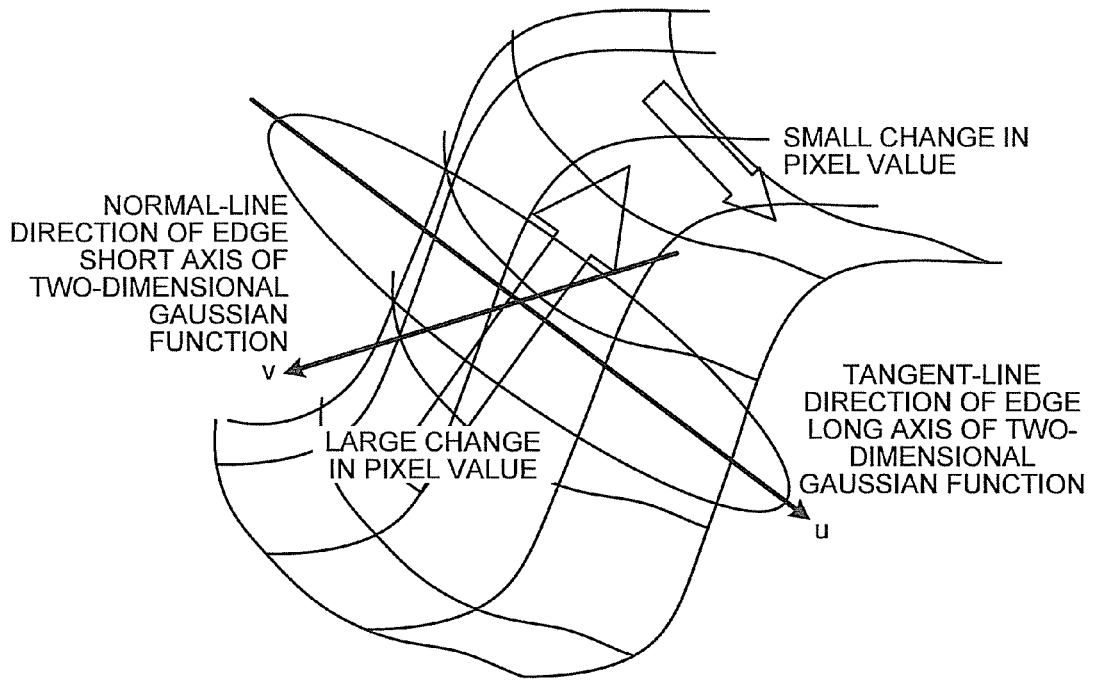
FIG. 4 is a diagram illustrating a relationship between a two-dimensional Gaussian function and a tangent-line direction and a normal-line direction of an edge.

Here, s (where s∈N) denotes the position of a point positioned in a predetermined area (hereinafter, a "local neighborhood") that is determined in advance around the position x as the center. The character "h" (where h>0) denotes a standard deviation of the anisotropic Gaussian distribution. The two-dimensional Gaussian function is strongly affected by the component of the edge in the normal-line direction. As shown in FIG. 4, the two-dimensional Gaussian function has an ellipsoidal shape in which the direction exhibiting a small change in the pixel value is substantially parallel to the long axis, whereas the direction exhibiting a large change in the pixel value is substantially parallel to the short axis. The sharper the edge is, the shorter is the minor axis of the ellipsoidal shape of the two-dimensional Gaussian function, i.e., the ellipse is flattened in the tangent-line direction of the edge. The image feature parameters can be calculated from the structure tensor H(x) by using Expressions (4) below.

$$\lambda_\pm = \frac{C_{xx} + C_{yy}}{2} \pm \sqrt{\frac{(C_{xx} + C_{yy})^2}{4} + C_{xy}^2} \quad (4)$$

$$\theta = \begin{cases} \frac{\pi}{4} & \text{if} (C_{xx} = C_{yy}) \cap (C_{xy} > 0) \\ -\frac{\pi}{4} & \text{if} (C_{xx} = C_{yy}) \cap (C_{xy} < 0) \\ 0 & \text{if } C_{xx} = C_{yy} = C_{xy} > 0 \\ \frac{1}{2}\tan^{-1}\left(\frac{2C_{xy}}{C_{xx} - C_{yy}}\right) & \text{otherwise} \end{cases}$$

Here, H(x) can be expressed as shown in Expression (5) below.

$$H(x) = \begin{bmatrix} d_x(x)^2 & d_x(x)d_y(x) \\ d_x(x)d_y(x) & d_y(x)^2 \end{bmatrix} = \begin{bmatrix} C_{xx} & C_{xy} \\ C_{xy} & C_{yy} \end{bmatrix}. \quad (5)$$

Figure 5:
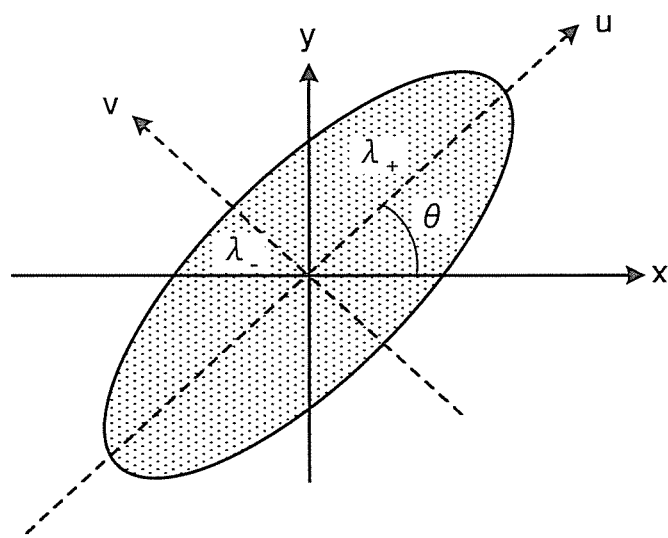
FIG. 5 is a diagram illustrating a rotation angle formed by an x-axis of an image and a long-axis direction of the two-dimensional Gaussian function.

As shown in FIG. 5, a rotation angle θ is an angle formed by the x axis of the image and the long-axis direction of the two-dimensional Gaussian function. "λ+" denotes the length of the major axis of the ellipse representing the two-dimensional Gaussian function, whereas "λ−" denotes the length of the minor axis thereof. It should be noted that "λ+" and "λ−" are eigen values for the structure tensor. The long axis of the two-dimensional Gaussian function substantially coincides with the tangent-line direction of the edge. The short axis of the two-dimensional Gaussian function substantially coincides with the normal-line direction of the edge. If no further arrangement were made, it would not be possible to calculate the image feature parameters in a stable manner due to noises contained in the image. Thus, it is acceptable to use a structure tensor obtained by performing a convolution operation with respect to a point positioned within the local neighborhood N that is centered around the position x, as shown in Expression (6) below.

$$H(x) = \frac{1}{Num(N)} \sum_{s \in N} \begin{bmatrix} d_x(x+s)^2 & d_x(x+s)d_y(x+s) \\ d_x(x+s)d_y(x+s) & d_y(x+s)^2 \end{bmatrix} \quad (6)$$

The local neighborhood N may have an arbitrary shape. For example, it is acceptable to use a rectangular area corresponding to a 5-by-5 tap (i.e., five pixels by five pixels; hereinafter, the notation of "pixels" may be omitted) that is around the position x as the center, as the local neighborhood N.

At step S303, according to the rotation angle θ, the converting unit 203 performs a coordinate converting process to convert the coordinates of the position s (hereinafter, the "local coordinates s") within the local neighborhood N with respect to the position x to local coordinates u expressed with rotated coordinates. The coordinate converting process to convert the x-y coordinates of the image into u-v local coordinates of the two-dimensional Gaussian function is expressed by using Expressions (7) below.

$$u = R^{-1}(\theta)s \quad (7)$$

$$R^{-1}(\theta) = \begin{bmatrix} \cos\theta & \sin\theta \\ -\sin\theta & \cos\theta \end{bmatrix}$$

Here, $u=(u, v)^T$ denotes the local coordinates of the two-dimensional Gaussian function.

At step S304, the fitting unit 204 calculates parameters for a curved surface for which a fitting process is performed by a curved surface fitting process that employs a least-squares method. A curved surface fitting process that employs an n'th-order polynomial curved surface model, which is disclosed in Patent Literature 1, will be explained. For example, an n'th-order polynomial curved surface model can be expressed by using Expression (8) shown below.

$$a_0 + a_1 s + a_2 t + a_3 s^2 + a_4 st + a_5 t^2 + \ldots \quad (8)$$

Here, $s=(s, t)^T$ denotes the local coordinates. The curved surface fitting process using the curved surface model is performed with respect to the local neighborhood N, while using the position x as the center. An output pixel value obtained after the curved surface fitting process has been performed can be expressed as $I(x)=a_0$.

The curved surface fitting process that is disclosed in Patent Literature 1 has problems as descried below.

For example, let us discuss an edge that extends in a diagonal direction. To perform a fitting process on the edge by using a second-order curved surface, it is necessary to have all the parameters $a_0, a_1, a_2, a_3, a_4$, and $a_5$. In contrast, to perform a fitting process on an edge extending in a longitudinal direction, only the parameters $a_0, a_1$, and $a_3$ are necessary, because the t component of the local coordinates is not necessary for the edge extending in the longitudinal direction. Similarly, to perform a fitting process on an edge extending in a transversal direction, only the parameters $a_0, a_2$, and $a_5$ are necessary.

As explained here, the fitting process disclosed in Patent Literature 1 is dependent on the direction of each edge. When the number of parameters that are required in the fitting process increases, there is a possibility that the stability of the fitting process may be lowered. In an attempt to cover all the directions, more parameters than necessary will be used, and there is a possibility that over-fitting may occur. The level of stability of the fitting process that employs the least-squares method is determined by the number of parameters to be estimated and the number of sample points that can be fitted. When more parameters than necessary with respect to the number of sample points are used, the fitting process becomes unstable.

The long-axis direction of the two-dimensional Gaussian function corresponds to the tangent-line direction of the edge. The short-axis direction of the two-dimensional Gaussian function corresponds to the normal-line direction of the edge. The change in the pixel value is large in the normal-line direction of the edge and is small in the tangent-line direction of the edge. When this characteristic is applied to the fitting process using a curved surface, the number of parameters for the curved surface becomes large, because the change in the pixel value is large in the normal-line direction of the edge. As a result, the degree of freedom becomes higher, and it is therefore possible to perform the fitting process with a higher level of precision. In contrast, in the tangent-line direction of the edge, the number of parameters for the curved surface does not have to be large, because the change in the pixel value is small. Accordingly, the curved surface model can be expressed by using Expression (9) shown below.

$$a_0 + a_1 v + a_2 v^2 + \ldots \quad (9)$$

Here, the local coordinates $u=(u, v)^T$ of the two-dimensional Gaussian function are used. The character "u" denotes the long axis of the two-dimensional Gaussian function, whereas the character "v" denotes the short axis of the two-dimensional Gaussian function. In the present example, the degree of freedom of the curved surface is set only in the short-axis direction of the two-dimensional Gaussian function, while a 0th-order polynomial is used for the long-axis direction. The sharpness of the edge is adjusted in the short-axis direction, while denoising performance (i.e., to eliminate the noises) is improved in the long-axis direction. By using the curved surface model based on the rotation angle θ, it is possible to realize a fitting process that is not dependent on the direction of the edge. In addition, it is possible to enhance the sharpness of the edge by using fewer parameters than in the example disclosed in Patent Literature 1, and the level of stability of the fitting process is improved even if the same sample points are used.

For example, according to the technique disclosed in Patent Literature 1, it is necessary to use six parameters to express an edge with a level of precision of a second-order curved surface. In contrast, according to the first embodiment, only three parameters are necessary. As another example, according to the technique disclosed in Patent Literature 1, it is necessary to use fifteen parameters to express an edge with a level of precision Qf a fourth-order curved surface. In contrast, according to the first embodiment, only five parameters are necessary. As explained here, with regard to the number of required parameters, the higher the degree of freedom of the curved surface is, the larger is the difference between the conventional technique and the technique according to the first embodiment.

The curved surface fitting process is performed by using the least-squares method. The curved surface model is defined as shown in Expression (10) below.

$$f(u) = (1 \; v \; v^2 \; v^3 \; v^4) \begin{bmatrix} a_0 \\ a_1 \\ a_2 \\ a_3 \\ a_4 \end{bmatrix} \quad (10)$$

$$= p(u)a$$

In Expression (10), a fourth-order polynomial curved surface model is shown. However, it is acceptable to use a polynomial curved model of any order selected out of 0th to 5th and 7th and higher. Alternatively, instead of using a polynomial, it is acceptable to use a curved surface model based on a sine wave, as shown in Expression (11) below.

$$f(u) = (1 \; \sin w_0 v \; \sin 2w_0 v \; \sin 3w_0 v \; \sin 4w_0 v) \begin{bmatrix} a_0 \\ a_1 \\ a_2 \\ a_3 \\ a_4 \end{bmatrix} \quad (11)$$

$$= p(u)a$$

$w_0$:REFERENCE FREQUENCY

The pixel value of the pixel in the position s within the local neighborhood N around the position x as the center will be expressed as I(x+s) (where s∈N). The coordinate conversion applied to the local coordinates s according to the rotation angle θ can be realized by performing a coordinate converting step using a rotating matrix while using Expressions (12) shown below.

$$u = R^{-1}(\theta)s \quad (12)$$

$$R^{-1}(\theta) = \begin{bmatrix} \cos\theta & \sin\theta \\ -\sin\theta & \cos\theta \end{bmatrix}$$

By using Expressions (12), the pixel value I(x+s) and the curved surface $f(R^{-1}(\theta)s)$ are brought into correspondence with each other. The least-squares method is a method for obtaining a parameter that makes the squared error in this correspondence the smallest and can be defined as shown in Expressions (13) below.

$$\hat{a}(x) = \min_a E(x, a) \quad (13)$$

$$E(x, a) = \sum_{s \in N} k(x, s) \|I(x+s) - f(R^{-1}(\theta)s)\|^2$$

$$= \sum_{s \in N} k(x, s) \|I(x+s) - p(R^{-1}(\theta)s)a\|^2$$

$\hat{a}(x)$ IS WRITTEN AS $a^\wedge(x)$ IN THE SPECIFICATION

Here, $a^\wedge(x)$ is a parameter used in the fitting process that employs the least-squares method. k(x, s) denotes a weight applied to the point s. In the present example, a two-dimensional Gaussian function is used. The local neighborhood N may have any arbitrary shape. For example, it is acceptable to use a rectangular area corresponding to a 5-by-5 tap that is around the position x as the center, as the local neighborhood N. In the present example, to simplify the explanation, Expressions (13) will be expressed in a matrix format as shown in Expressions (14) below.

$$E(x, a) = (Y - Pa)^T W (Y - Pa) \quad (14)$$

$$Y = \begin{bmatrix} I(x + s_0) \\ \vdots \\ I(x + s_n) \end{bmatrix}$$

$$W = \begin{bmatrix} k(x, s_0) & 0 & 0 \\ 0 & \ddots & 0 \\ 0 & 0 & k(x, s_n) \end{bmatrix}$$

$$P = \begin{bmatrix} p(R^{-1}(\theta)s_0) \\ \vdots \\ p(R^{-1}(\theta)s_n) \end{bmatrix}$$

Here, points within the local neighborhood N are expressed as N={$s_0$, . . . , $s_n$}. When the matrix format is used, it is possible to find a solution to the least-squares method in a one-to-one correspondence by performing a matrix calculation as shown in Expression (15) below.

$$\hat{a}(x) = (P^T W P)^{-1} P^T W Y \quad (15)$$

Expression (15) is called a normal equation. When a linear least-squares method is used, the normal equation provides the optimal solution. It is possible to calculate values for an inverse matrix by using, for example, a Lower Upper (LU) decomposition or a singular value decomposition. Let us assume that $a^\wedge(x)$ has been calculated as shown in Expression (16) below.

$$\hat{a}(x) = (\hat{a}_0(x), \hat{a}_1(x), \hat{a}_2(x), \hat{a}_3(x), \hat{a}_4(x))^T \quad (16)$$

The output pixel obtained after the fitting process has been performed can be calculated by using Expression (17) shown below.

$$\hat{a}_0(x) \quad (17)$$

Figure 6:
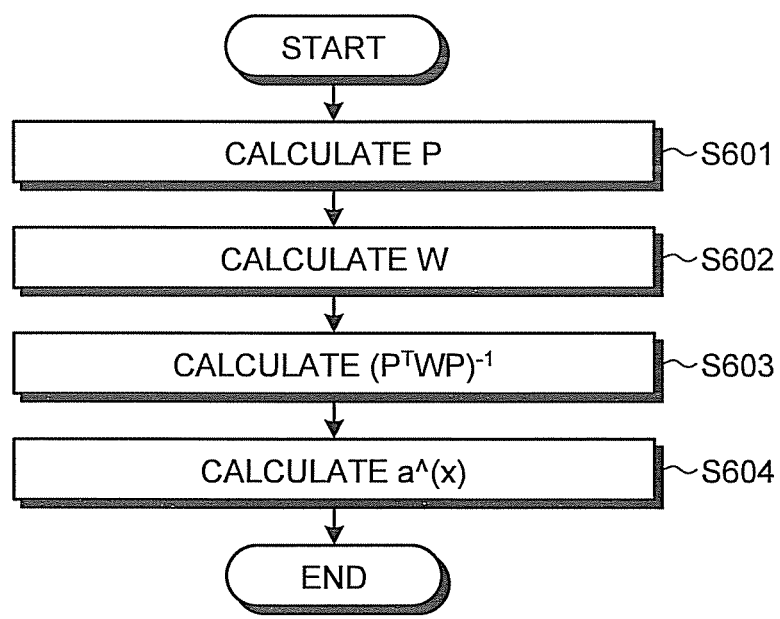
FIG. 6 is diagram illustrating operations in a curved surface fitting process performed by the image processing unit according to the first embodiment.

Operations performed in the curved surface fitting step at step S304 will be explained, with reference to FIG. 6. At step S601, the fitting unit 204 calculates a matrix P according to Expressions (14). At step S602, the fitting unit 204 calculates a matrix W according to Expressions (14) by using the image feature parameters shown in Expressions (4). At step S603, the fitting unit 204 calculates $(P^T WP)^{-1}$ by using an LU decomposition, a singular value decomposition, or the like. At step S604, the fitting unit 204 calculates $\hat{a}(x)$ according to Expression (15).

Figure 7A:
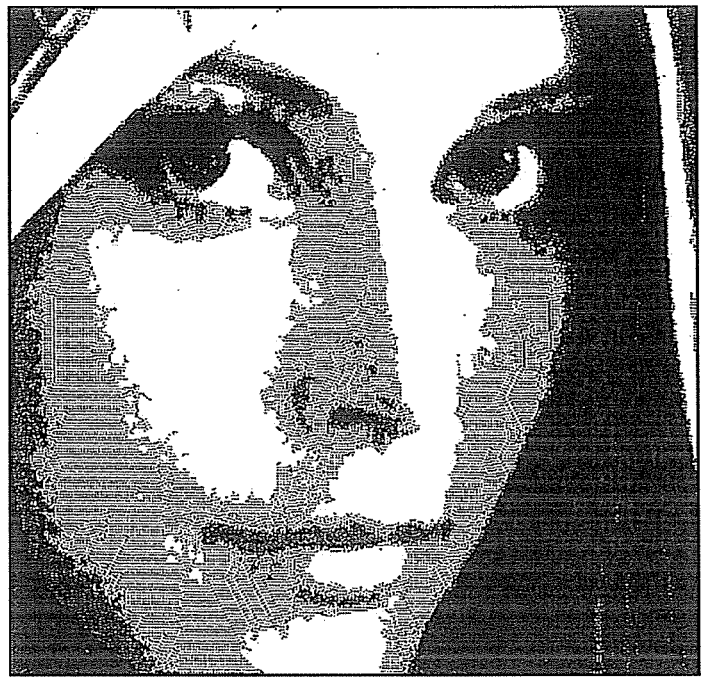
FIG. 7A is a diagram illustrating an original image.

A result of a fitting process performed by using a conventional kernel regression method and a result of the fitting process according to the first embodiment will be explained with reference to FIGS. 7 and 8.

Figure 7B:
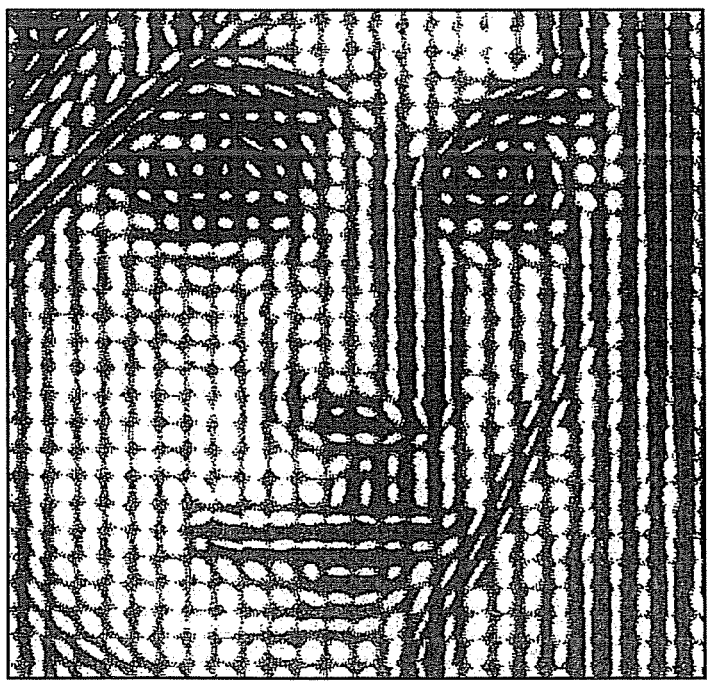
FIG. 7B is a diagram illustrating the shapes of two-dimensional Gaussian functions at points in the original image.
Figure 8A:
FIG. 8A is a diagram illustrating results of a fitting process performed with respect to x-y axes according to a conventional kernel regression method.
Figure 8B:
FIG. 8B is a diagram illustrating results of a fitting process performed with respect to x-y axes according to a conventional kernel regression method.

FIGS. 8A and 8B are diagrams illustrating results obtained by performing a curved surface fitting process on the image shown in FIG. 7B by using the least-squares method and performing a first-order derivative operation in the x direction and in the y direction, respectively. By referring to FIGS. 8A and 8B, it is understood that the parameters for the curved surface are distributed to the axes, while the model parameters are dependent on the rotation angle of the two-dimensional Gaussian function. As a result, to reproduce the edges in all the directions at the same level, it is necessary to have all the parameters on the second-order curved surface.

Figure 8C:
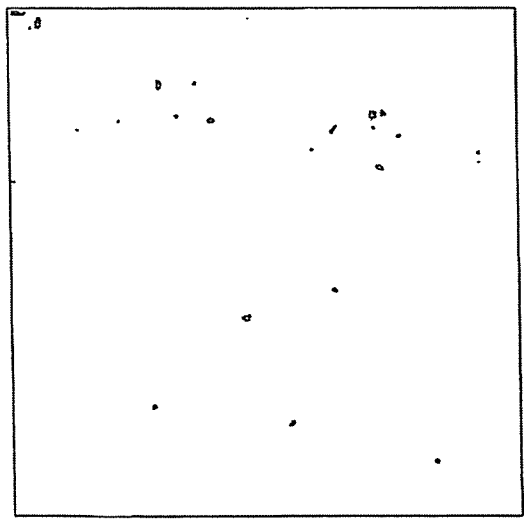
FIG. 8C is a diagram illustrating results of a fitting process performed with respect to u-v axes.
Figure 8D:
FIG. 8D is a diagram illustrating results of a fitting process performed with respect to u-v axes.

FIGS. 8C and 8D are diagrams illustrating results obtained by performing a curved surface fitting process on the image shown in FIG. 7B by using the least-squares method and performing a first-order derivative operation in the u direction (i.e., the long-axis direction of the two-dimensional Gaussian function) and in the v direction (i.e., the short-axis direction of the two-dimensional Gaussian function), respectively. By referring to FIGS. 8C and 8D, it is understood that the axes in the curved surface model coincide with the main component axes of the edges. As a result, the components of the edges are concentrated on the v axis (i.e., the short axis of the two-dimensional Gaussian function). Accordingly, to reproduce the edges in all the directions, using only the v axis is sufficient.

Figure 9:
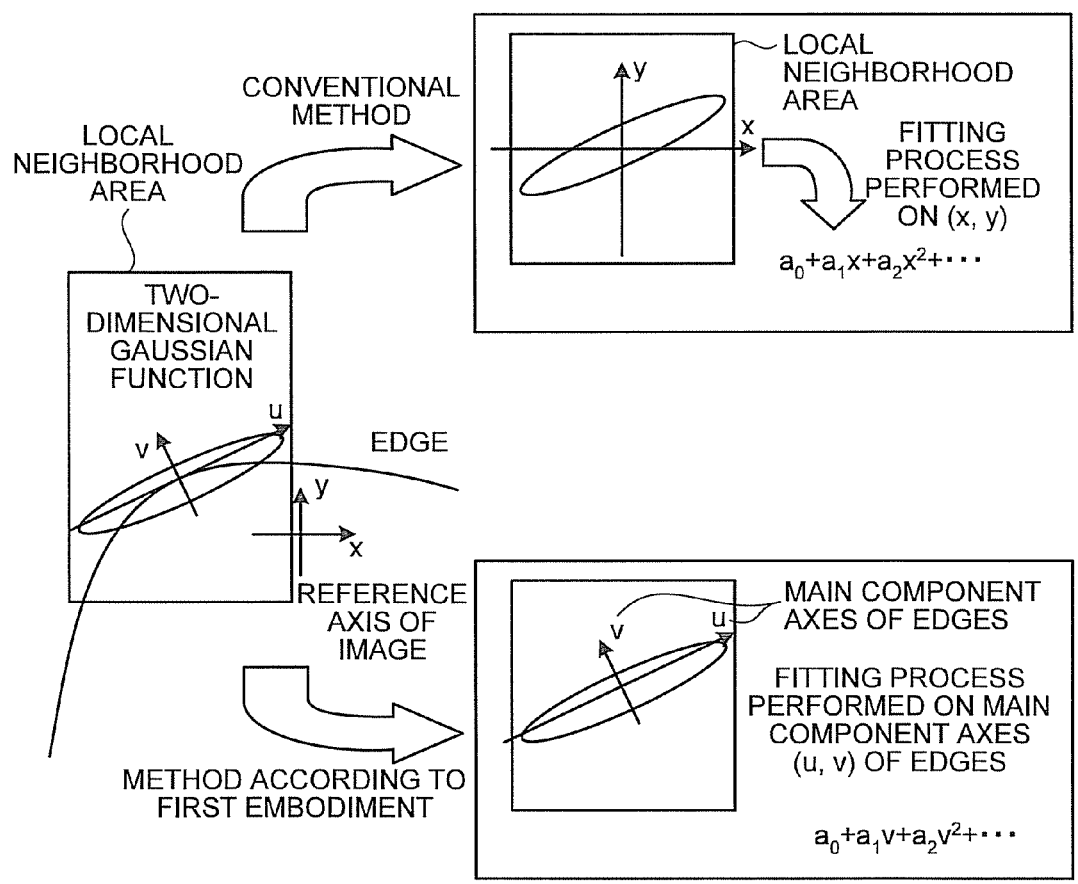
FIG. 9 is a diagram illustrating differences between the conventional method and a method according to the first embodiment.

Differences between the conventional method and the method according to the first embodiment will be explained, with reference to FIG. 9. According to the conventional method, the fitting process based on kernel regression is performed on the x-y axes. In contrast, according to the first embodiment, the fitting process based on kernel regression is performed on the u-v axes. Because the u-v axes are the main component axes of the edges, it is possible to distribute the degree of freedom in the maximum-amplitude direction (i.e., the main components) of the information.

As explained above, according to the first embodiment, it is possible to effectively eliminate noises from the image while maintaining the shapes and the edges in the image.

Second Embodiment

Figure 10:
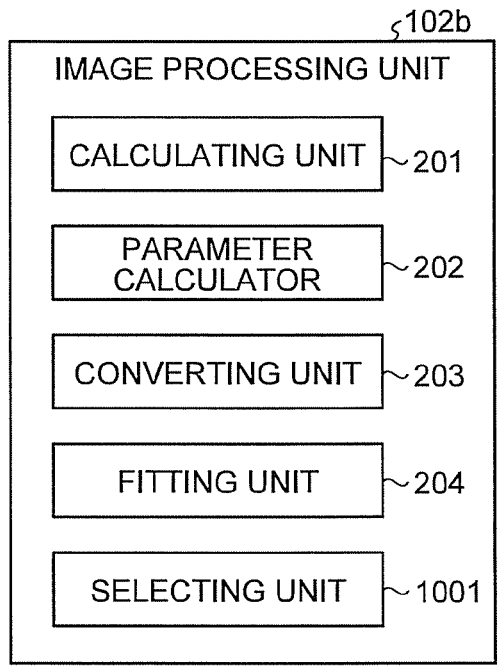
FIG. 10 is a diagram illustrating an image processing unit according to a second embodiment.

Some of the constituent elements of an image processing unit 102b according to a second embodiment shown in FIG. 10 that are the same as those of the image processing unit 102a shown in FIG. 2 will be referred to by using the same reference characters. The second embodiment is different from the first embodiment in that the image processing unit 102b includes a selecting unit 1001.

In the first embodiment, the filtering process that is excellent in terms of reproducibility of the edges is performed by rotating the curved surface model in the tangent-line directions of the edges. In the edge portions, the information is concentrated in the short-axis direction of the ellipse of the two-dimensional Gaussian function, i.e., the normal-line direction of the edge as explained above, and thus the curved surface in which the degree of freedom is given to the short-axis component fits well.

It should be considered, however, that an image contains not only edge areas, but also flat areas and corner areas (e.g., corners and pointed extremities). In such areas, the information is not necessarily concentrated on the short-axis component. In the second embodiment, areas are classified according to image features, so that an appropriate one of curved surface models can be assigned according to the classification. In the second embodiment, the image features are obtained by using an x-direction derivative value and a y-direction derivative value. More specifically, the image features are obtained by using a structure tensor, which is also explained in the description of the first embodiment.

Figure 3:
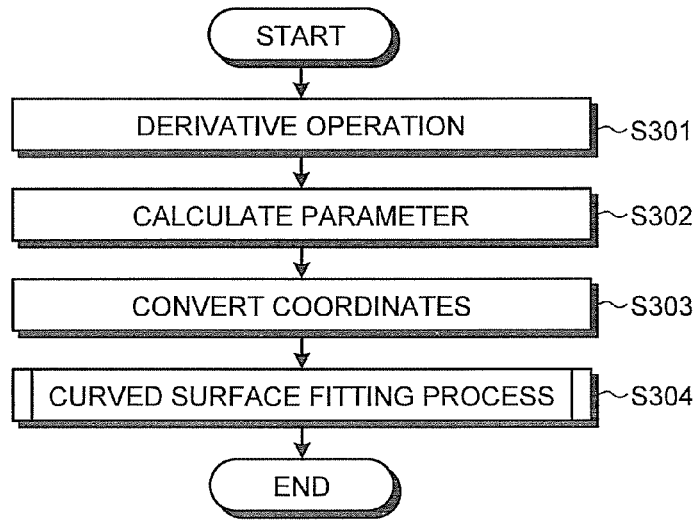
FIG. 3 is a diagram illustrating operations performed by the image processing unit according to the first embodiment.
Figure 11:
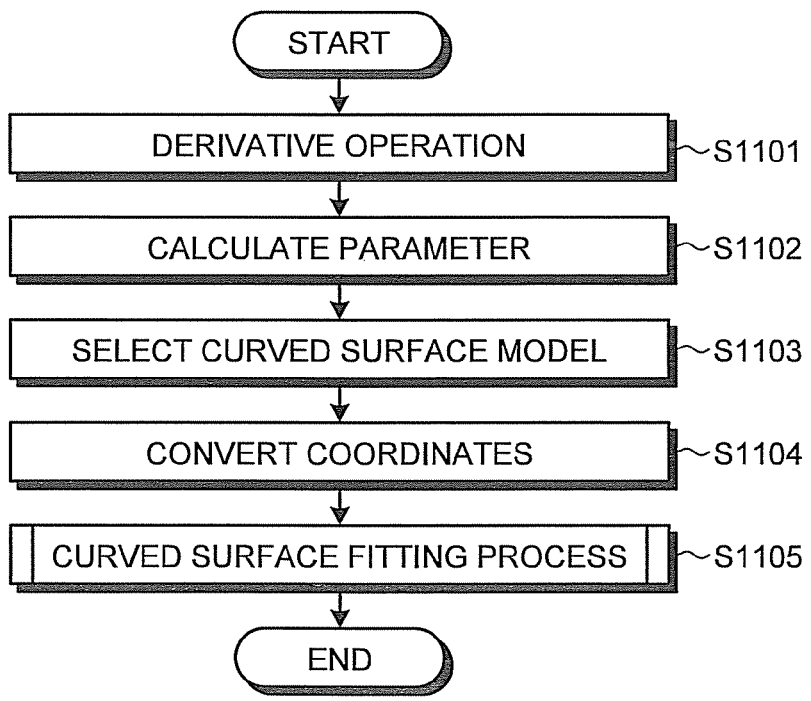
FIG. 11 is a diagram illustrating operations performed by the image processing unit according to the second embodiment.

As shown in FIG. 11, the operations performed by the image processing unit 102b shown in FIG. 10 are different from the operations shown in FIG. 3 in, at least, that a curved surface model selecting step at step S1103 is performed before the coordinate converting step and the curved surface fitting step. The other steps will be explained while a focus is placed on the differences from FIG. 3.

At step S1102, the tangent-line direction of the edge as well as the parameters corresponding to the long axis and the short axis of the ellipse that express local features of the image are calculated by using a structure tensor. Harris et al. have presented a feature classification of images based on a structure tensor (cf. C. Harris and M. Stephens (1988), "A Combined Corner and Edge Detector", Proceedings of the 4th Alvey Vision Conference, pp. 147-151).

Figure 12:
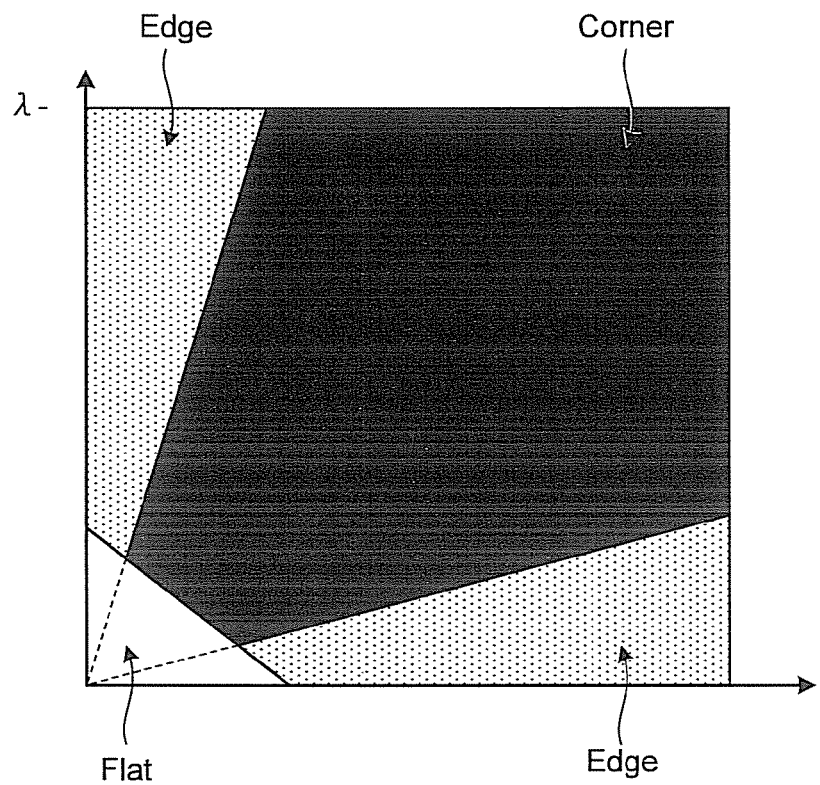
FIG. 12 is a diagram illustrating an image feature classification by Harris.

According to the feature classification, when eigen values of the structure tensor are expressed as $\lambda+$ and $\lambda-$, each of the portions in an image can be classified as an edge area ("Edge"), a flat area ("Flat"), or a corner area ("Corner") as shown in FIG. 12, according to the eigen values $\lambda_+$ and $\lambda_-$. When one of the eigen values $\lambda_+$ and $\lambda_-$ is large and the other is small, the ellipse of the two-dimensional Gaussian function has a flattened shape. In that situation, the corresponding image portion is classified as an edge area. When both of the eigen values are large, the ellipse of the two-dimensional Gaussian function has an isotropic circular shape and is small. In that situation, the corresponding image portion is classified as a corner area (including a corner or a pointed extremity). When both of the eigen values are small, the ellipse of the two-dimensional Gaussian function has an isotropic circular shape and is large. In that situation, the corresponding image portion is classified as a flat area.

The curved surface model in the first embodiment is a curved surface model that uses only the short-axis component of the ellipse of the two-dimensional Gaussian function. This curved surface model is based on the notion that the information is concentrated in the normal-line directions of the edges in the edge areas, and the model is suitable for the edge areas among the areas explained above. For example, in the first embodiment, an edge area curved surface model as shown in Expression (18) below may be considered.

$$f_{Edge}(u) = a_0 + a_1 v + a_2 v^2 + a_3 v^3 + a_4 v^4 \quad (18)$$

In contrast, in corner areas and flat areas, the ellipse of the two-dimensional Gaussian function is isotropic, and the information is not necessarily concentrated on the short axis (i.e., the v axis). Thus, it is more appropriate to use both the u axis and the v axis in the corner areas and the flat areas. Of these areas, with regard to the corner areas, because the change in the pixel value is large, it is more appropriate to give a higher degree of freedom to the curved surface model. For example, a corner area curved surface model as shown in Expression (19) below may be considered.

$$f_{Corner}(u) = a_0 + a_1 u + a_2 u^2 + a_3 u^3 + a_4 u^4 + a_5 v + a_6 v^2 + a_7 v^3 + a_8 v^8 \quad (19)$$

In contrast, because it is desirable to keep the noises as little as possible in the flat areas, a flat area curved surface model based on a low-order polynomial as shown in Expression (20) below may be considered.

$$f_{Flat}(u) = a_0 + a_1 u + a_2 u^2 + a_3 v + a_4 v^2 \tag{20}$$

At step S1103, the selecting unit 1001 classifies a target pixel as one of a plurality of predetermined classes (i.e., areas). The selecting unit 1001 selects one of the curved surface models, which respectively correspond in a one-to-one correspondence to the plurality of classes classified, as the curved surface model for the target pixel. More specifically, the selecting unit 1001 classifies the target pixel based on the eigen values $\lambda_+$ and $\lambda_-$ of the structure tensor. The classification process is performed according to, for example, the classification explained with reference to FIG. 12. The selecting unit 1001 selects the curved surface model according to the result of the classification process.

At step S1105, the fitting unit 204 performs the fitting process that employs the least-squares method, by using the curved surface model that has been selected at step S1103.

Third Embodiment

Figure 13:
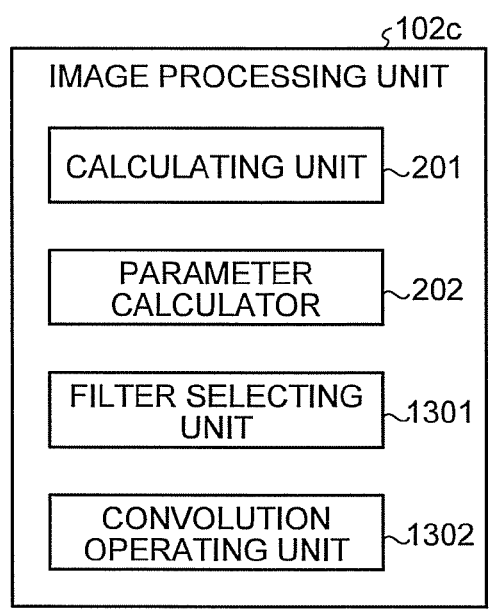
FIG. 13 is a diagram illustrating an image processing unit according to a third embodiment.

Some of the constituent elements of an image processing unit 102c according to a third embodiment shown in FIG. 13 that are the same as those of the image processing unit 102a shown in FIG. 2 will be referred to by using the same reference characters. The third embodiment is different from the first embodiment in that the image processing unit 102c includes a filter selecting unit 1301 and a convolution operating unit 1302, instead of the converting unit 203 and the fitting unit 204.

In the first embodiment, it is necessary to solve the normal equation for each of the pixels that are the targets of the filtering process. More specifically, it is necessary to calculate the values for the inverse matrix by using an LU decomposition or a singular value decomposition. In the third embodiment, for the purpose of reducing the processing cost, results obtained by solving the normal equation in advance are stored in a Look-Up Table (LUT). With this arrangement, it is possible to enhance viability in a circuit or the like.

Figure 14:
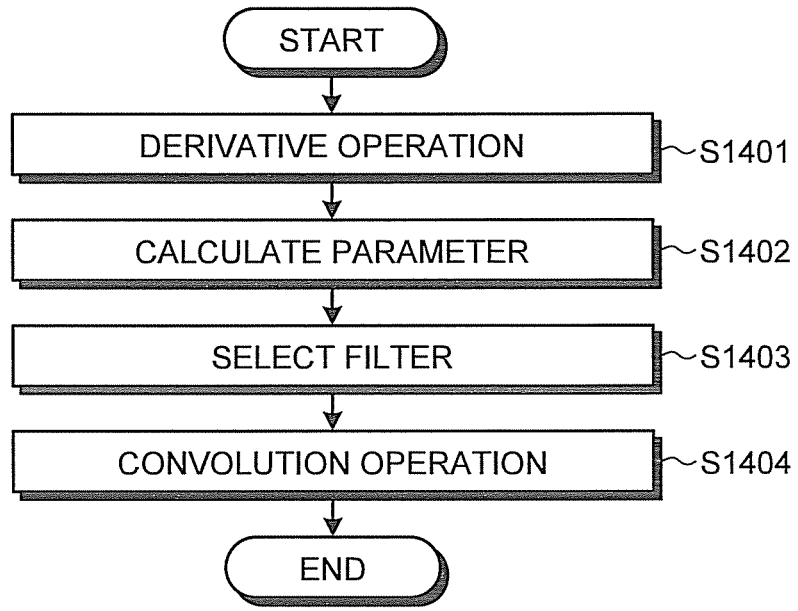
FIG. 14 is a diagram illustrating operations performed by the image processing unit according to the third embodiment.

Operations shown in FIG. 14 that are performed by the image processing unit 102c shown in FIG. 13 are different from the operations explained with reference to FIG. 3 in, at least, that the procedure includes a filter selecting step at step S1403 and a convolution operating step at step S1404, instead of the coordinate converting step at step S303 and the curved surface fitting step at step S304. The other steps are the same as those shown in FIG. 3.

At step S1403, the filter selecting unit 1301 selects an appropriate filter out of the LUT showing the results obtained by solving the normal equation, based on the image feature parameters that have been calculated at step S1402.

The normal equation is obtained by using Expression (15). As shown in Expressions (14), Y denotes a pixel value and varies depending on the input image. The value $(P^T W P)^{-1} P^T W$ is dependent only on the image feature parameters $\lambda_+, \lambda_+$, and $\theta$ and is not dependent on the image. The two-dimensional Gaussian function can be expressed by using self-correlation coefficients for a derivative of the input image, as shown in Expressions (21).

$$k(x, s) = \exp\left(-\frac{1}{h^2} s^T H(x) s\right) \tag{21}$$

-continued $$H(x) = \begin{bmatrix} d_x(x)^2 & d_x(x)d_y(x) \\ d_x(x)d_y(x) & d_y(x)^2 \end{bmatrix}$$

By rewriting Expressions (21) with the image feature parameters, Expression (22) can be obtained.

$$H(x) = \begin{bmatrix} \lambda_+ \cos^2\theta + \lambda_- \sin^2\theta & (\lambda_+ - \lambda_-)\sin\theta\cos\theta \\ (\lambda_+ - \lambda_-)\sin\theta\cos\theta & \lambda_+ \sin^2\theta + \lambda_- \cos^2\theta \end{bmatrix} = H(\lambda_+, \lambda_-, \theta) \tag{22}$$

It is also possible to rewrite the two-dimensional Gaussian function as shown in Expression (23) below.

$$k(\lambda_+, \lambda_-, \theta, s) = \exp\left(-\frac{1}{h^2} s^T H(\lambda_+, \lambda_-, \theta) s\right) \tag{23}$$

It is possible to express the matrix W as shown in Expression (24) below.

$$W(\lambda_+, \lambda_-, \theta) = \begin{bmatrix} k(x, s_0) & 0 & 0 \\ 0 & \ddots & 0 \\ 0 & 0 & k(x, s_n) \end{bmatrix} \tag{24}$$

$$= \begin{bmatrix} k(\lambda_+, \lambda_-, \theta, s_0) & 0 & 0 \\ 0 & \ddots & 0 \\ 0 & 0 & k(\lambda_+, \lambda_-, \theta, s_n) \end{bmatrix}$$

It is understood that the matrix W is dependent only on the image feature parameters. Similarly, it is possible to express the matrix P as shown in Expression (25) below.

$$P(\theta) = \begin{bmatrix} p(R^{-1}(\theta)s_0) \\ \vdots \\ p(R^{-1}(\theta)s_n) \end{bmatrix} \tag{25}$$

It is understood that the matrix P is dependent only on the image feature parameters. Accordingly, it is understood that Expression (26) is also dependent only on the image feature parameters.

$$X(\lambda_+, \lambda_-, \theta) = (P(\theta)^T W(\lambda_+, \lambda_-, \theta) P(\theta))^{-1} P(\theta)^T W(\lambda_+, \lambda_-, \theta) \tag{26}$$

By calculating $X(\lambda_+, \lambda_-, \theta)_l$ (where $l=0, \ldots, L$), in advance, with respect to an arbitrary set of image feature parameters that have been discretized such as $(\lambda_+, \lambda_-, \theta)_l$ (where $l=0, \ldots, L$), it is possible to obtain the solution by using Expression (27) without performing any additional calculation.

$$\hat{a}(x) = X(\lambda_+, \lambda_-, \theta)_l Y \tag{27}$$

In other words, at the filter selecting step at step S1403, the values $X(\lambda_+, \lambda_-, \theta)_l$ (where $l=0, \ldots, L$) are calculated in advance with respect to $(\lambda_+, \lambda_-, \theta)_l$ (where $l=0, \ldots, L$) so that the calculated values are registered into the LUT (i.e., a filter bank). In the actual process, a corresponding one of the values $X(\lambda_+, \lambda_-, \theta)_l$ is selected out of the LUT, based on the calculated image feature parameters $(\lambda_+, \lambda_-, \theta)$.

At step S1404, the convolution operating unit 1302 performs a convolution operation with the pixel value vector Y, by using the filter $X(\lambda_+, \lambda_-, \theta)_l$ that has been selected at the filter selecting step at step S1403. Further, the convolution operating unit 1302 calculates an output pixel to which a curved surface has been fitted by using the least-squares method. More specifically, the convolution operating unit 1302 performs a matrix calculation shown in Expression (28) below.

$$\hat{a}(x) = X(\lambda_+, \lambda_-, \theta)_1 Y = X(\lambda_+, \lambda_-, \theta)_1 \begin{bmatrix} I(x+s_0) \\ \vdots \\ I(x+s_n) \end{bmatrix} \quad (28)$$

Fourth Embodiment

Figure 15:
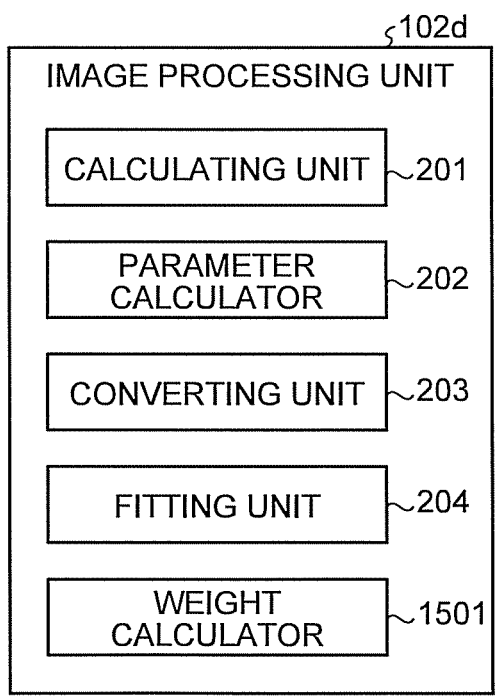
FIG. 15 is a diagram illustrating an image processing unit according to a fourth embodiment.

Some of the constituent elements of an image processing unit 102d according to a fourth embodiment shown in FIG. 15 that are the same as those of the image processing unit 102a shown in FIG. 2 will be referred to by using the same reference characters. The fourth embodiment is different from the first embodiment in that the image processing unit 102d includes a weight calculator 1501.

In the first and the second embodiments, the filtering process that is suitable for the edges in the input image is performed by using the two-dimensional Gaussian function. However, because it is not possible to express, for example, apex portions of a triangle by using a two-dimensional Gaussian function, the image becomes dull. Thus, in the fourth embodiment, the two-dimensional Gaussian function is made robust based on pixel values of the pixels that are in the apex portions of a triangle or the like, so that the problem where, for example, the apex portions become dull can be solved.

Figure 16:
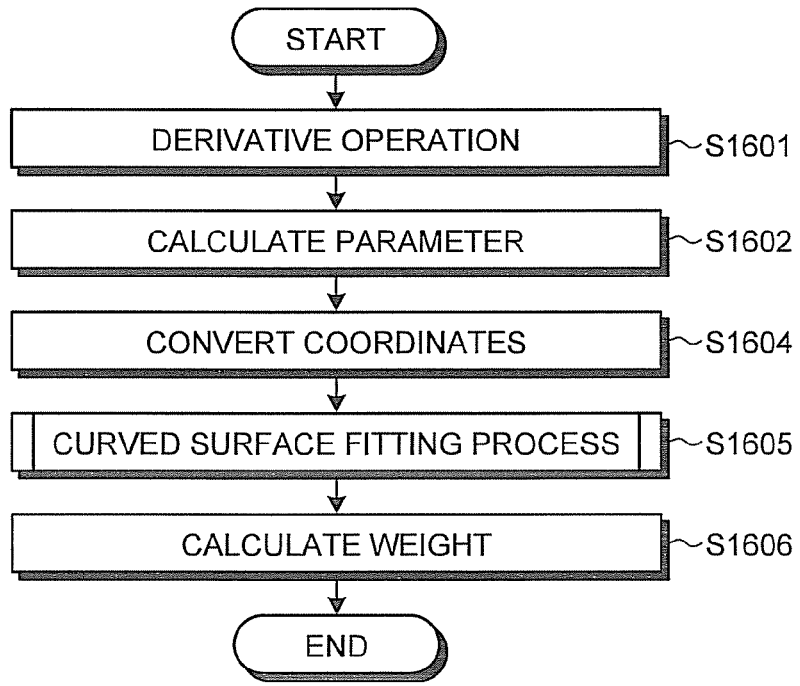
FIG. 16 is a diagram illustrating operations performed by the image processing unit according to the fourth embodiment.

As shown in FIG. 16, the operations performed by the image processing unit 102d shown in FIG. 15 are different from the operations explained with reference to FIG. 3 in, at least, that the procedure includes a weight calculating step at step S1606 after the curved surface fitting step at step S1605. The other steps will be explained while a focus is placed on the differences from FIG. 3.

The process performed at step S1605 is basically the same as the process performed in the first embodiment, except that the fitting unit 204 calculates the matrix W by using Expression (29) shown below.

$$W = \begin{bmatrix} w(s_0)k(x,s_0) & 0 & 0 \\ 0 & \ddots & 0 \\ 0 & 0 & w(s_n)k(x,s_n) \end{bmatrix} \quad (29)$$

At step S1606, the weight calculator 1501 applies a weight to a pixel value in the input image within the local neighborhood, according to the distance from the target pixel that is positioned at the center of the local coordinates. For example, in the local neighborhood, the larger the difference from the pixel value of the target pixel in the input image is, the smaller is the weight, and the smaller the difference is, the larger is the weight. Two-dimensional Gaussian functions are applicable to step edge portions in an image. However, two-dimensional Gaussian functions may not be applicable to extremity portions and corners in some situations. When a fitting process that employs the least-squares method is performed in such areas to which two-dimensional Gaussian functions are not applicable, the image is severely distorted because of out-of-range pixel values to which the function is not applicable. As a result, a problem arises where, for example, corners become dull. The areas having such out-of-range values are assumed to be areas containing pixels each having a pixel value that is different from the pixel value of the target pixel. It is possible to define the weight based on the difference in the pixel values by using a Gaussian function as shown in Expressions (30) below.

$$w(s) = k_{\sigma 1}(I(x+s) - I(s)) \quad (30)$$

$$k_{\sigma 1}(I) = \exp\left(-\frac{I^T I}{\sigma_1^2}\right).$$

Here, $\sigma_1$ (where $\sigma_1 > 0$) denotes a standard deviation of the Gaussian function and serves as a parameter indicating what degree of difference in the pixel values causes the weight to be smaller.

In a situation where a block distortion occurs, e.g., in an encoded image, the weight calculated by using Expressions (30) also reacts to the block distortion. As a result, the problem of the block distortion is not solved. Thus, it is also acceptable to use a deblocking-type weight as shown in Expression (31) below so that the weight based on the difference in the pixel values is not used in block boundary areas.

$$w(s) = \begin{cases} k_{\sigma 1}(I(x+s) - I(s)) & \text{WHEN } x \text{ AND } s \text{ ARE POINTS IN THE SAME BLOCK} \\ 1 & \text{OTHERWISE} \end{cases} \quad (31)$$

Fifth Embodiment

Figure 17:
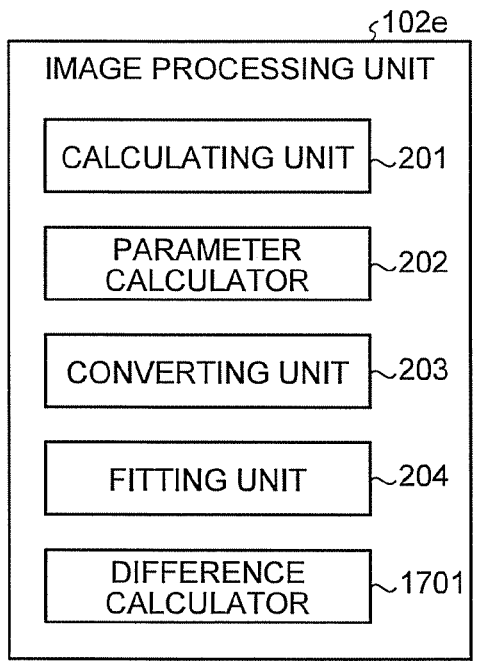
FIG. 17 is a diagram illustrating an image processing unit according to a fifth embodiment.

Some of the constituent elements of an image processing unit 102e according to a fifth embodiment shown in FIG. 17 that are the same as those of the image processing unit 102a shown in FIG. 2 will be referred to by using the same reference characters. The fifth embodiment is different from the first embodiment in that the image processing unit 102e includes a difference calculator 1701.

In the present embodiment, a difference between a pixel value on the curved surface that is fitted according to any of the first to the fourth embodiments and a pixel value in the input image is calculated so that a fitting process is performed again on the calculated difference. With this arrangement, it is possible to enhance reproducibility of, for example, a fine texture.

Figure 18:
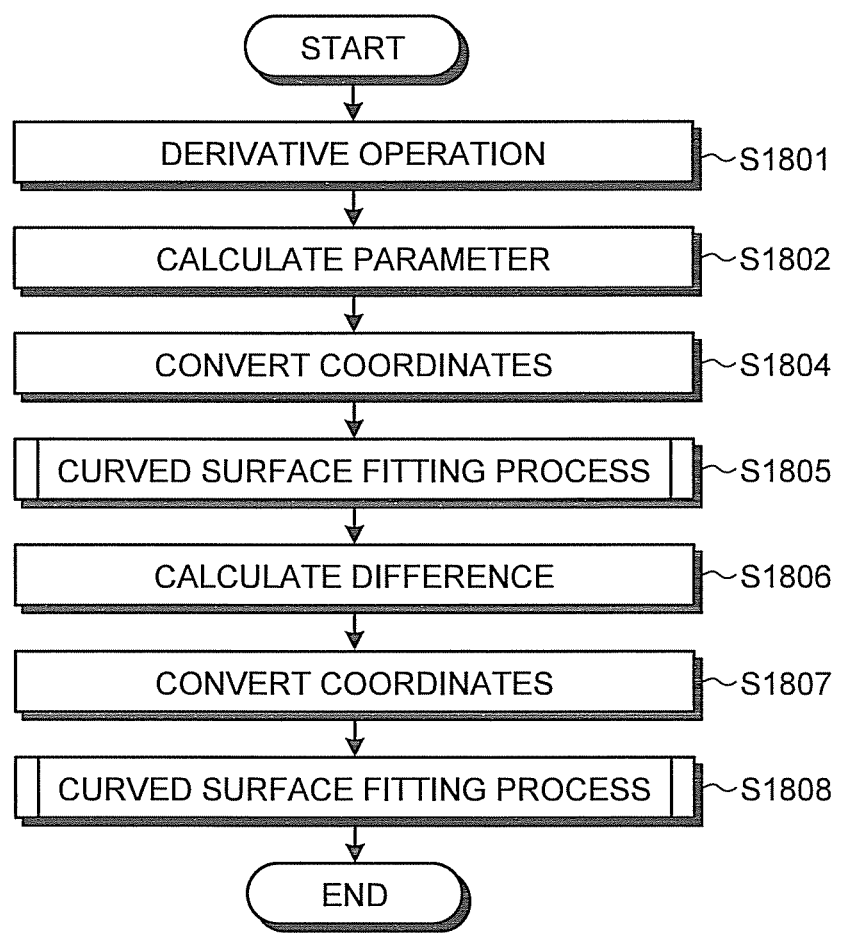
FIG. 18 is a diagram illustrating operations performed by the image processing unit according to the fifth embodiment.

As shown in FIG. 18, the operations performed by the image processing unit 102e shown in FIG. 17 are different from the operations explained with reference to FIG. 3 in, at least, that the procedure includes a difference calculating step at step S1806, a coordinate calculating step at step S1807, and a curved surface fitting step at step S1808, after the curved surface fitting step at step S1805. The other steps will be explained while a focus is placed on the differences from FIG. 3.

When the input image is assumed to be made up of a framework component, a texture component, and noises, it is possible to provide a model for the pixel I(x) as shown in Expression (32) below.

$$I(x) = S(x) + T(x) + n(x) \quad (32)$$

Here, S(x) denotes a framework component, whereas T(x) denotes a texture component, while n(x) denotes a noise.

Expression (32) corresponds to an addition model. It is also acceptable to use a multiplication model as shown in Expression (33) below.

$$I(x)=S(x)\cdot T(x)+n(x) \quad (33)$$

In the first to the fourth embodiments, the degree of freedom of the curved surface is set in the normal-line directions of the edges and is not set in the tangent-line directions of the edges. This ignores irregularities in the tangent-line directions of the edges and is equivalent to extracting the framework component. Thus, it is possible to consider the result of the curved surface fitting process that employs the least-squares method as the framework component of the image as shown in Expression (34) below.

$$S(x)=\hat{a}_0(x) \quad (34)$$

At step S1806, the difference calculator 1701 calculates the difference between a pixel value in the input image and a pixel value of the framework component. First, the texture component can be calculated as shown in Expression (35) below, based on Expressions (32) and (34).

$$T(x)=I(x)-\hat{a}_0(x)-n(x) \quad (35)$$

From this, it is understood that, to obtain the texture component, it is necessary to obtain the difference between the pixel value in the input image and the pixel value of the framework component. A fitting curved surface can be expressed as shown in Expression (36) below.

$$f(u)=p(u)\hat{a} \quad (36)$$

Accordingly, it is possible to calculate the difference by using Expression (37) below.

$$r(x+s) = I(x+s) - f(R^{-1}(\theta)s) \quad (37)$$
$$= I(x+s) - p(R^{-1}(\theta)s)\hat{a}$$

Here, s denotes a point within the local neighborhood N.

At step S1808, the fitting unit 204 calculates the texture component by performing, with respect to the difference that has been calculated at step S1806, a curved surface fitting process that employs the least-squares method on the local coordinates obtained as a result of the coordinate converting process performed at step S1807. It is possible to express a texture curved surface model by using Expression (38) shown below.

$$f_r(u) = (1\ u\ u^2\ u^3\ u^4)\begin{bmatrix} b_0 \\ b_1 \\ b_2 \\ b_3 \\ b_4 \end{bmatrix} \quad (38)$$
$$= p_r(u)b$$

In the first to the fourth embodiments, the model is set in the normal-line directions of the edges. In contrast, in the present example, the model is set in the tangent-line directions of the edges. This arrangement is made to extract the texture component in the tangent-line directions of the edges that are orthogonal to the normal-line directions of the edges based on which the framework component of the image is extracted. The least-squares method applied to the difference can be expressed by using Expressions (39) shown below.

$$\hat{b}(x) = \min_b E(x, b) \quad (39)$$

$$E(x, b) = \sum_{s \in N} k(x+s)\|r(x, s) - f_r(R^{-1}(\theta)s)\|^2$$
$$= \sum_{s \in N} k(x+s)\|r(x, s) - p_r(R^{-1}(\theta)s)b\|^2$$

$\hat{b}(x)$ IS WRITTEN AS b^(x) IN THE SPECIFICATION

By putting Expressions (39) into a matrix format, Expressions (40) below can be obtained.

$$E(x, b) = (Y_r - P_r b)^T W(Y_r - P_r b) \quad (40)$$

$$Y_r = \begin{bmatrix} r(x+s_0) \\ \vdots \\ r(x+s_n) \end{bmatrix}$$

$$W = \begin{bmatrix} k(x, s_0) & 0 & 0 \\ 0 & \ddots & 0 \\ 0 & 0 & k(x, s_n) \end{bmatrix}$$

$$P_r = \begin{bmatrix} p_r(R^{-1}(\theta)s_0) \\ \vdots \\ p_r(R^{-1}(\theta)s_n) \end{bmatrix}$$

Accordingly, a normal equation can be expressed as shown in Expression (41) below.

$$\hat{b}(x)=(P_r^T W P_r)^{-1} P_r^T W Y_r \quad (41)$$

It is possible to calculate values for an inverse matrix by using, for example, an LU decomposition or a singular value decomposition. Let us assume that b^(x) has been calculated as shown in Expression (42) below.

$$\hat{b}(x)=(\hat{b}_0(x),\hat{b}_2(x),\hat{b}_3(x),\hat{b}_4(x))^T \quad (42)$$

In this situation, the texture component can be expressed by using Expression (43) below.

$$\hat{b}_0(x) \quad (43)$$

The image processing unit 102e adds the curved surface model and the texture curved surface model together and generates an output image. In other words, it is possible to express the output image that is obtained after the filtering process has been performed, by using Expression (44) below.

$$\hat{a}_0(x)+\hat{b}_0(x) \quad (44)$$

Sixth Embodiment

Figure 19:
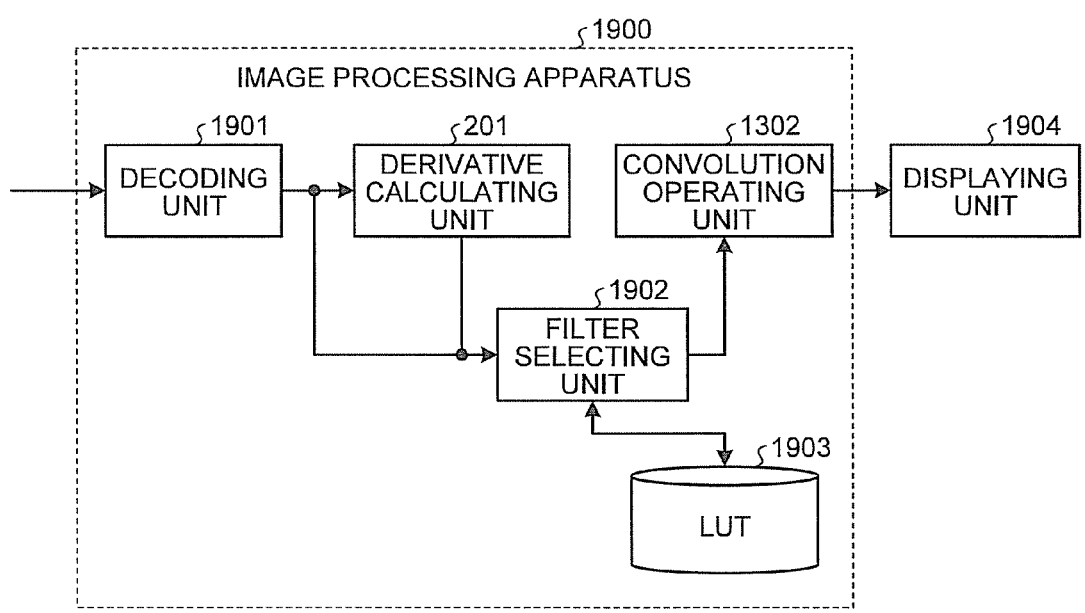
FIG. 19 is a diagram illustrating an image display apparatus according to a sixth embodiment.

FIG. 19 is a diagram illustrating an image display apparatus according to the present embodiment. The image display apparatus of the present embodiment includes an image processing apparatus 1900 and a displaying unit 1903 that displays an image. Some of the constituent elements of the image processing apparatus 1900 shown in FIG. 19 that are the same as those of the image processing unit 102c shown in FIG. 13 will be referred to by using the same reference characters, and the detailed descriptions thereof will be omitted.

The image processing apparatus 1900 decodes input data, and includes a decoding unit 1901 that obtains an input image, a filter selecting unit 1902, and a Look-UP Table (LUT) 1903. The filter selecting unit 1902 and the LUT 1903 perform the same operation as that of the filter selecting unit 1301 shown in FIG. 13.

The filter selecting unit 1902 changes a filter to be selected based on an encoding method for input data.

Filter coefficients calculated in advance are stored in the LUT 1903. The filter coefficients are prepared for each encoding method. For example, the LUT 1903 stores therein, for each of combinations of the direction and the magnitude of the gradient of pixel values, filter coefficients. The filter coefficients are determined by a curved surface approximated by using a curved surface model, which uses the displacements of the edges of an image on the coordinate axes in the tangent-line direction or the normal-line direction as variables, and in which the degree of freedom of variables indicating the displacements of the edges on the coordinate axes in the normal-line direction is higher than the degree of freedom of variables indicating the displacements of the edges on the coordinate axes in the tangent-line direction.

For example, filter coefficients determined by a curved surface approximated by a curved surface model based on the high degree of freedom are stored in the LUT 1903, as filter coefficients used when input data is encoded according to an encoding method with good encoding efficiency such as H. 264. Filter coefficients generated by a curved surface model having a lower degree of freedom than that when the input data is encoded using H. 264 are stored in the LUT 1903, as filter coefficients used when the input data is encoded using an encoding method such as H. 263 whose encoding efficiency is lower than that of H. 264.

The method for switching the filter coefficients depending on the encoding methods has been described. However, filters may be switched depending on the sizes of the input image. For example, for small images, a filter coefficient by which the size of a target area used in a convolution operation is reduced is generated and stored in the LUT 1903. For large input images, a filter coefficient by which the size of a target used in a convolution operation is increased is also generated and stored in the LUT 1903.

According to the image processing apparatus 1900 of the present embodiment, it is possible to perform suitable image processing in accordance with the encoding method and the size of an input image. For example, images encoded by different encoding methods and images of different sizes are distributed through the Internet. Even if the encoding method and the image size of the input data are different in various ways, it is possible to obtain high quality images.

The present invention is not limited to the exemplary embodiments described above. It is possible to apply modifications without departing from the gist thereof. An image processing computer program used by any of the image processing apparatuses according to the embodiments described above to execute the processing steps may be provided as a computer program product as being recorded on a computer-readable recording medium such as a Compact Disk Read-Only Memory (CD-ROM), a Flexible Disk (FD), a Compact Disk Recordable (CD-R), or a Digital Versatile Disk (DVD), in a file that is in an installable format or in an executable format.

Further, another arrangement is acceptable in which the image processing computer program according to any of the embodiments is provided as being incorporated in a ROM or the like in advance.

The image processing computer program executed by any of the image processing apparatuses according to the embodiments described above has a module configuration that includes the image processing unit 102 or the units of the image processing apparatus 1900 described above. As the actual hardware configuration, the image processing unit 102 or any of the units of the image processing apparatus 1900 is loaded into a main storage device (not shown) when a Central Processing Unit (CPU) (i.e., a processor; not shown) reads and executes the image processing computer program from a storage medium (not shown), so that the image processing unit 102 or any of the units of the image processing apparatus 1900 is generated in the main storage device.

The invention claimed is:

1. An image processing apparatus comprising:
a circuit that performs:
calculating at least one of a tangent-line direction and a normal-line direction of an edge around a target pixel in an input image by using a direction and a magnitude of a gradient of pixel values of pixels neighboring the target pixel in the input image;
converting coordinates of pixels neighboring the target pixel into rotated coordinates rotated to rotated coordinate axes, the rotated coordinate axes having a short axis and a long axis, wherein the short axis traverses the normal-line direction and the long axis traverses the tangent-line direction; and
fitting by obtaining a curved surface by using a curved surface model described by a position of pixels on the rotated coordinate axes, the curved surface approximating a distribution of local pixel values neighboring the target pixel, and by calculating a corrected pixel value of the target pixel from an approximated pixel value of the target pixel on the curved surface and based on the position of pixels on the rotated coordinate axes.

2. The image processing apparatus according to claim 1, wherein the circuit further performs:
classifying the target pixel into a plurality of predetermined classes by using the direction and the magnitude of the gradient of the pixel values neighboring the target pixel, and selecting one of curved surface models corresponding to the classes as the curved surface model of the target pixel, wherein
the fitting calculates the curved surface based on the curved surface model selected.

3. The image processing apparatus according to claim 1, wherein, in the rotated coordinates, the fitting uses the curved surface model in which a degree of freedom of a variable indicating a displacement of the edge on the coordinate axes in the normal-line direction is higher than a degree of freedom of a variable indicating a displacement of the edge on the coordinate axes in the tangent-line direction.

4. The image processing apparatus according to claim 1, wherein the circuit further performs:
applying a weight to each pixel neighboring the input image according a distance from the target pixel to the pixel, wherein
the fitting unit calculates a curved surface approximated based on a pixel value obtained by multiplying the weight by the pixel value of the input image.

5. The image processing apparatus according to claim 4, wherein the weight is applied in such a manner that the larger a difference between the pixel value of the pixel and the pixel value of the target pixel is, the smaller is the weight applied to the pixel value of the pixel.

6. The image processing apparatus according to claim 1, wherein the rotated coordinates are two-dimensional rotated coordinates and the curved surface model is a two-dimensional curved surface.

7. An image processing apparatus comprising:
a circuit that performs:
calculating a direction and a magnitude of a gradient of pixel values of pixels neighboring a target pixel in an input image;
storing a filter coefficient for each of combinations of the direction and the magnitude of the gradient of the pixel values, the filter coefficient being determined by a curved surface approximated by using a curved surface model, the curved surface model described by variables of displacement on rotated coordinate axes having a short axis and a long axis, the short axis traversing a normal-line direction of an edge around a target pixel in an image and the long axis traversing a tangent-line direction of the edge, a degree of freedom of the variable on the normal-line direction of the edge being higher than that of the variable on the tangent-line direction of the edge;
referring to a memory and selecting the filter coefficient based on the direction and the magnitude of the gradient calculated for the target pixel; and
calculating a corrected pixel value of the target pixel by filtering based on the selected filter coefficient and the position of pixels on the rotated coordinate axes.

8. The image processing apparatus according to claim 7, wherein the circuit further performs:
obtaining the input image by decoding input data;
storing a filter coefficient for each encoding method, and selecting the filter coefficient based on an encoding method for the input data.

9. The image processing apparatus according to claim 7, wherein the circuit further performs:
obtaining the input image by decoding input data, wherein storing a filter coefficient for each image size; and
selecting the filter coefficient based on a size of the input image.

10. An image display apparatus comprising:
the image processing apparatus according to claim 7, and
a display that displays an image.

11. The image display apparatus according to claim 10, wherein the circuit further performs:
obtaining the input image by decoding input data;
storing a filter coefficient for each encoding method; and
selecting the filter coefficient based on an encoding method for the input data.

12. The image display apparatus according to claim 10, wherein the circuit further performs:
obtaining the input image by decoding input data;
storing a filter coefficient for each image size; and
selecting the filter coefficient based on a size of the input image.

13. The image display apparatus according to claim 10, wherein the curved surface model is a two-dimensional curved surface model.

14. The image processing apparatus according to claim 7, wherein the curved surface model is a two-dimensional curved surface model.

15. An image processing method comprising:
calculating at least one of a tangent-line direction and a normal-line direction of an edge around a target pixel in an input image by using a direction and a magnitude of a gradient of pixel values of pixels neighboring the target pixel in the input image;
converting coordinates of pixels neighboring the target pixel into rotated coordinates rotated to rotated coordinate axes, the rotated coordinate axes having a short axis and a long axis, wherein the short axis traverses the normal-line direction and the long axis traverses the tangent-line direction; and
fitting by obtaining a curved surface, in which a distribution of local pixel values neighboring the target pixel is approximated using a curved surface model that employs a position on the rotated coordinate axes as a variable, and by calculating a corrected pixel value of the target pixel from an approximated pixel value of the target pixel at a position on the curved surface and based on the position of pixels on the rotated coordinate axes.

16. The processing method according to claim 15, further comprising:
classifying the target pixel into a plurality of predetermined classes by using the direction and the magnitude of the gradient of the pixel values neighboring the target pixel, and selecting one of the curved surface models that corresponds to the classes as the curved surface model of the target pixel, wherein the fitting calculates the curved surface based on the curved surface model selected.

17. The image processing method according to claim 15, wherein, in the rotated coordinates, the fitting uses the curved surface model in which a degree of freedom of a variable indicating a displacement of the edge on the coordinate axes in the normal-line direction is higher than a degree of freedom of a variable indicating a displacement of the edge on the coordinate axes in the tangent-line direction.

18. The image processing method according to claim 15, further comprising:
applying a weight to each pixel neighboring the input image according a distance from the target pixel to the pixel, wherein
the fitting calculates a curved surface approximated based on a pixel value obtained by multiplying the weight by the pixel value of the input image.

19. The image processing method according to claim 18, wherein the weight is applied in such a manner configured to the larger a difference between the pixel value of the pixel and the pixel value of the target pixel is, the smaller is the weight applied to the pixel value of the pixel.

20. The image processing method according to claim 15, wherein the rotated coordinates are two-dimensional rotated coordinates and the curved surface model is a two-dimensional curved surface.

* * * * *